US011403465B2

(12) United States Patent
Matthews et al.

(10) Patent No.: US 11,403,465 B2
(45) Date of Patent: Aug. 2, 2022

(54) SYSTEMS AND METHODS FOR REPORT PROCESSING

(71) Applicant: ROYAL BANK OF CANADA, Montreal (CA)

(72) Inventors: Ryan Matthews, Etobicoke (CA); Hoda Zare, Montreal (CA); Owain West, Philadelphia, PA (US)

(73) Assignee: ROYAL BANK OF CANADA, Toronto (CA)

( * ) Notice: Subject to any disclaimer, the term of this patent is extended or adjusted under 35 U.S.C. 154(b) by 349 days.

(21) Appl. No.: 16/549,728

(22) Filed: Aug. 23, 2019

(65) Prior Publication Data

US 2020/0065387 A1 Feb. 27, 2020

Related U.S. Application Data

(60) Provisional application No. 62/722,582, filed on Aug. 24, 2018.

(51) Int. Cl.

| *G06F 40/20* | (2020.01) |
|---|---|
| *G06F 40/211* | (2020.01) |
| *G06F 40/226* | (2020.01) |
| *G06F 40/295* | (2020.01) |
| *G06F 40/289* | (2020.01) |
| *G06F 40/30* | (2020.01) |
| *G06F 16/242* | (2019.01) |
| *G06F 3/0484* | (2022.01) |
| *G06N 20/00* | (2019.01) |
| *G06F 40/284* | (2020.01) |
| *G06Q 30/02* | (2012.01) |

(52) U.S. Cl.
CPC ............ *G06F 40/30* (2020.01); *G06F 3/0484* (2013.01); *G06F 16/243* (2019.01); *G06F 40/284* (2020.01); *G06N 20/00* (2019.01); *G06Q 30/0201* (2013.01)

(58) Field of Classification Search
USPC ................ 382/100, 128, 154–160, 173–231; 704/1–10, 200–275; 715/200–277
See application file for complete search history.

(56) References Cited

U.S. PATENT DOCUMENTS

| 7,536,413 | B1 * | 5/2009 | Mohan .................. G06F 16/355 |
|---|---|---|---|
| | | | 707/999.102 |
| 8,832,092 | B2 * | 9/2014 | Spivack .................. G06F 40/40 |
| | | | 707/723 |
| 10,169,453 | B2 * | 1/2019 | Luo ..................... G06F 17/30719 |
| 10,431,204 | B2 * | 10/2019 | Paulik ...................... G10L 25/33 |
| 10,515,379 | B2 * | 12/2019 | Gupta ................ G06Q 30/0201 |
| 10,664,696 | B2 * | 5/2020 | Patil ......................... G06F 16/93 |
| 2015/0332157 | A1 * | 11/2015 | Baughman ............. G06N 20/00 |
| | | | 706/52 |
| 2016/0004725 | A1 * | 1/2016 | Liu .......................... G06F 16/29 |
| | | | 707/724 |

(Continued)

*Primary Examiner* — Marcellus J Augustin
(74) *Attorney, Agent, or Firm* — Norton Rose Fulbright Canada LLP

(57) ABSTRACT

A platform that involves a natural language engine with a corpora to process vendor assurance reports, e.g., SOC1, SSAE16, etc. for summarizing key sections, detecting important sections and key phrases of reports, extracting exceptions and noting client control considerations, and trending the reports.

24 Claims, 4 Drawing Sheets

(56) References Cited

U.S. PATENT DOCUMENTS

| | | | | |
|---|---|---|---|---|
| 2016/0004742 | A1* | 1/2016 | Mohan | G06F 16/215 707/694 |
| 2019/0347668 | A1* | 11/2019 | Williams | H04L 67/2833 |
| 2020/0202171 | A1* | 6/2020 | Hughes | G06N 7/005 |

* cited by examiner

FIG. 3

SYSTEMS AND METHODS FOR REPORT PROCESSING

FIELD

The present disclosure generally relates to the field of natural language processing.

INTRODUCTION

There can be different types of reports, such as vendor assurance reports. An example vendor assurance report is a System and Organization Controls (SOC) report. SOC reports refer to documents about controls at a service organization that can relate to internal control over financial reporting, security, availability, processing integrity, confidentiality, privacy, or trust. SOC reports are likely relevant to an audit of financial statements. An SOC report can help organizations build trust and confidence in the service performed and controls related to the services through a report by an independent entity. There can be different types of SOC reports. An SOC report can be a long document that is very time-consuming to review in order to flag relevant data.

SUMMARY

In accordance with an aspect, there is provided a platform for automatically detecting exceptions in report data using natural language processing. The platform has a natural language engine having a corpora of report data and exception data, the natural language engine to process training report data to update the corpora. The platform has an extraction unit to extract exceptions from a report using the natural language engine. The platform has a summarization unit to generate a summary for the report using the natural language engine to detect topics for sections of the report, at least one of the topics linked to at least one exception of the extracted exceptions, the summary indicating the at least one exception. The platform has a trend unit to generate trending data for the report and historical reports, the trending data relating to an aggregation of the exceptions. The platform has a presentation unit to generate an interface for display at an interface application residing on a device, the interface having visual elements corresponding to the exceptions, the summary and the trending data, the visual elements being selectable to trigger commands to update display of the exceptions, the summary and the trending data.

In accordance with an aspect, there is provided a platform with a memory storing instructions to configure a processor to provide: a natural language engine having a corpora, the natural language engine to process training report data to update the corpora; an extraction unit to extract exceptions from a report using the natural language engine; an summarization unit to generate a summary for the report using the natural language engine to understand topics for sections the report; a trend unit to generate trending data for the report and historical reports, the trending data relating to an aggregation of exceptions; and a presentation unit to generate an interface for display at an interface application, the interface having visual elements corresponding to the exceptions, the summary and the trending data.

In some embodiments, the extraction unit uses image processing and character recognition to detect tables, columns, and rows, wherein the exceptions are extracted from the tables, columns, and rows.

In some embodiments, the extraction unit categorizes the exception based on a level of severity.

In some embodiments, the summarization unit generates an abstractive summary by determining a topic for a section of the report using a word graph.

In some embodiments, the summarization unit generates an extractive summary based on frequency of sentences or words in a report.

In some embodiments, the trend unit assigns categories to the trending data such as Stable, Stable with Minor exception and Unstable with Major Exceptions.

In some embodiments, the natural language engine implements unsupervised learning to compute a semantic similarity score between the report and the training data.

In some embodiments, the natural language engine implements supervised learning to compute a probabilistic classification for the report and a corresponding confidence score, the probabilistic classification used for the exception or a topic.

In some embodiments, the natural language engine generates the corpora by tokenizing and cleansing the training data to generate feature vectors.

In some embodiments, the natural language engine converts the training data to feature vectors using a bag-of-words model to represent the training data as a multiset of words that retains multiplicity and disregards grammar and word order.

In some embodiments, the natural language engine converts the training data to feature vectors using a term frequency and inverse document frequency real-valued weights model to identify semantic relationships between words of the training data.

In some embodiments, the natural language engine converts the training data to feature vectors using latent semantic analysis to extract conceptual concepts from the training data and patterns in semantic relationships between words of the training data, the natural language engine computing topics for semantic similarity queries.

In some embodiments, the natural language engine implements a semantic similarity query to compare data of the report against the training data to determine a similarity score for the data of the report within a similarity threshold.

In some embodiments, the similarity query involves computing a similarity score based on a cosine measurement between a feature vector for the data of the report and a feature vector for the training data.

In an aspect, embodiments described herein provide non-transitory computer readable medium storing instructions for automatically detecting exceptions in report data using natural language processing. The instructions are executable by a processor to configure a natural language engine having a corpora of report data and exception data, the natural language engine to process training report data to update the corpora. The instructions are executable by the processor to configure an extraction unit to extract exceptions from a report using the natural language engine to compute a semantic similarity score between the report and the training data and a probabilistic classification for the report with a corresponding confidence score, the probabilistic classification used for extracting the exceptions. The instructions are executable by the processor to configure a summarization unit to generate a summary for the report using the natural language engine to detect topics for sections of the report. The instructions are executable by the processor to configure a trend unit to generate trending data for the report and historical reports, the trending data relating to an aggregation of the exceptions.

In an aspect, embodiments described herein provide a method for automatically detecting exceptions in report data using natural language processing. The method involves extracting exceptions from a report using a natural language engine, the natural language engine having a corpora of report data and exception data; generating a summary for the report using the natural language engine to detect topics for sections of the report using feature vectors; generating trending data for the report and historical reports, the trending data relating to an aggregation of the exceptions; and generating an interface for display at an interface application residing on a device, the interface having visual elements corresponding to the exceptions, the summary and the trending data, the visual elements being selectable to trigger commands to update display of the exceptions, the summary and the trending data.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 3 is an example interface according to some embodiments; and

DETAILED DESCRIPTION

Embodiments described herein provide a system that automatically review reports (such as vendor assurance reports) and detects exceptions in the reports using natural language processing. Embodiments described herein provide a system that processes vendor assurance reports to automatically generate summary documents for the reports using natural language generation. Embodiments described herein provide a system that uses machine learning and natural language processing to processes vendor assurance reports to extract data and generate summary documents.

It can be time consuming to manually review reports (e.g. documents, files) to detect and check a particular section for key recommendations to implement or ensure that there has not been a material change from the last time the report was reviewed. The report can be a PDF file of a document, for example. Embodiments described herein provide a computer application for reading, parsing and manipulating data from report documents and mine the document data for intelligible phrases. The application can be configurable through rules and code.

Embodiments described herein provide a system that processes vendor assurance reports, e.g., SOC1, SSAE16, etc. using a centralized repository, automatically summarizing key sections, detecting important sections and key phrases of reports, extracting exceptions and noting client control considerations, and trending the reports.

Figure 1:
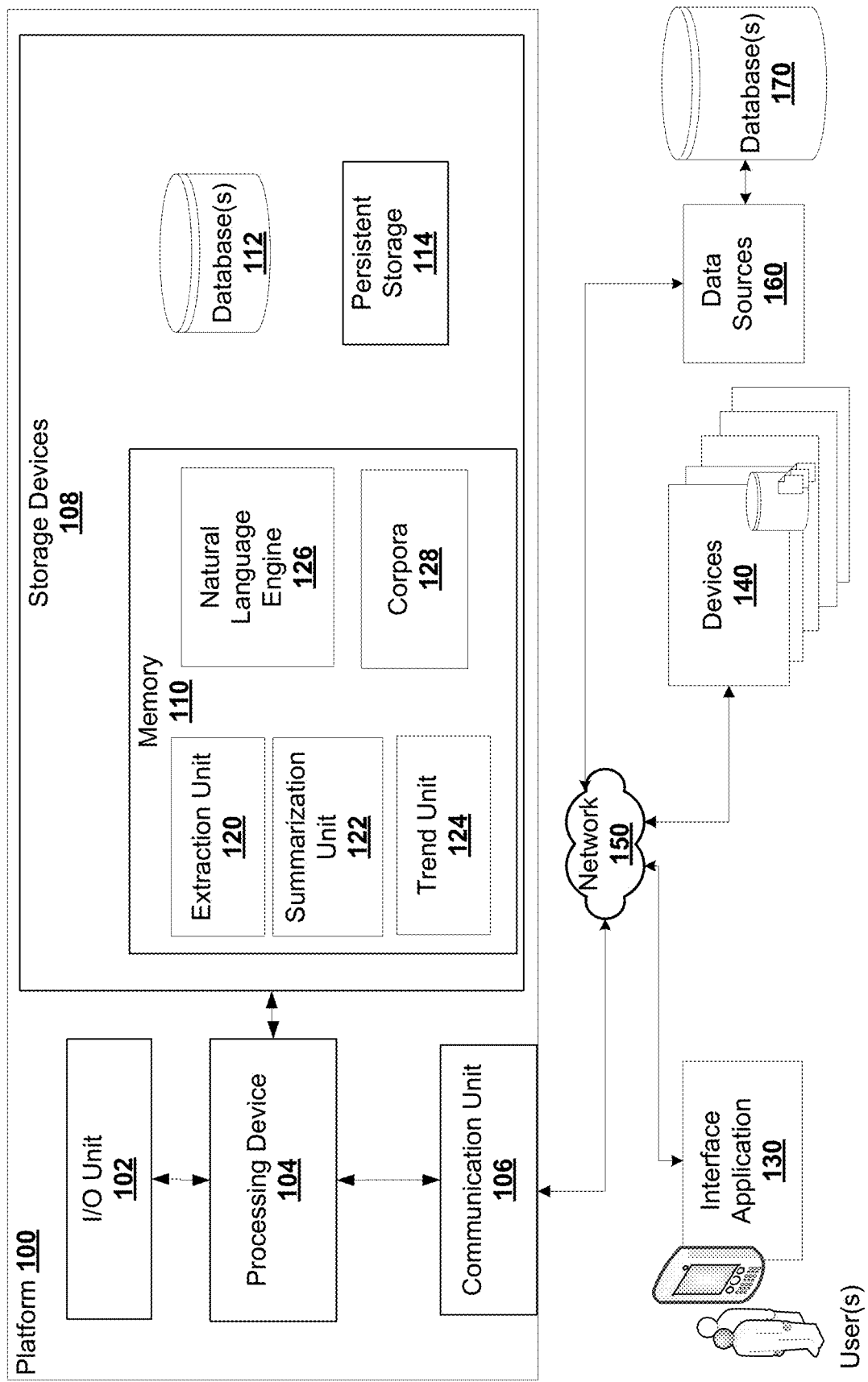
FIG. 1 is an example platform for processing reports according to some embodiments.

FIG. 1 is an example platform 100 for processing reports according to some embodiments. The platform 100 includes an I/O unit 102, processing device 104, communications unit 106 and storage device 108. The storage device 108 can include databases 112, persistent storage 114, and memory 110. The platform 100 can connect to interface application 130, devices 140 and data sources 160. The memory 110 can include instructions executable by the processing device 104 to configure an extraction unit 120, summarization unit 122, trend unit 124, natural language engine 126, corpora 128 (e.g. risk-based corpora). The platform 100 can generate an interface for display at an interface application 130. The interface has visual elements corresponding to the exceptions, the summary and the trending data. The visual elements can be selected to send commands to the platform 100 regarding the exceptions. This can trigger platform 100 to re-compute data which in turn triggers an update of the visual elements for the exceptions at the interface. The visual elements enable a user to interact with the back-end platform 100 to dynamically update the interface.

The natural language engine 126 uses and builds a corpora 128 to enable components of the platform 100 to automatically understand terms of the reports. The corpora 128 has report data and exception data. The terms of the reports may hold different meanings in different fields or domains. The natural language engine 126 processes training report data to update the corpora 128. The natural language engine 126 can train the corpora 128 using different training processes. In some embodiments, the natural language engine 126 implements unsupervised learning to compute a semantic similarity score between the report and the training data. In some embodiments, the natural language engine 126 implements supervised learning to compute a probabilistic classification for the report and a corresponding confidence score, the probabilistic classification used for the exception or a topic. In some embodiments, the natural language engine generates the corpora by tokenizing and cleansing the training data to generate feature vectors. In some embodiments, the natural language engine 126 converts the training data to feature vectors using a bag-of-words model to represent the training data as a multiset of words that retains multiplicity and disregards grammar and word order. In some embodiments, the natural language engine 126 converts the training data to feature vectors using a term frequency and inverse document frequency real-valued weights model to identify semantic relationships between words of the training data. In some embodiments, the natural language engine 126 converts the training data to feature vectors using latent semantic analysis to extract conceptual concepts from the training data and patterns in semantic relationships between words of the training data, the natural language engine computing topics for semantic similarity queries. In some embodiments, the natural language engine 126 implements a semantic similarity query to compare data of the report against the training data to determine a similarity score for the data of the report within a similarity threshold. In some embodiments, the similarity query involves computing a similarity score based on a cosine measurement between a feature vector for the data of the report and a feature vector for the training data.

The extraction unit 120 can extract exceptions from a report using the natural language engine 126. In some embodiments, the extraction unit 120 uses image processing and character recognition to detect tables, columns, and rows, wherein the exceptions are extracted from the tables, columns, and rows. In some embodiments, the extraction unit 120 categorizes the exception based on a level of severity.

The summarization unit 122 can generate a summary for the report using the natural language engine 126 to understand topics for sections of the report and use the topics to generate the summary The summary can include a description of a topic and an exception, for example. In some embodiments, the summarization unit 122 generates an abstractive summary by determining a topic for a section of the report using a word graph. In some embodiments, the summarization unit 122 generates an extractive summary based on frequency of sentences or words in a report.

The trend unit 124 can generate trending data for the report and historical reports. The trending data can relate to an aggregation of exceptions. In some embodiments, the trend unit 124 assigns categories to the trending data such as Stable, Stable with Minor exception and Unstable with Major Exceptions.

For example, the platform 100 can receive SOC report pdf files in an encrypted format and decrypt the files. After decrypting the files, the platform 100 can provide the files to extraction unit 120, summarization unit 122, and trend unit 124 for processing.

The extraction unit 120 can extract exceptions noted in the report plain text and also in tables. Image processing and character recognition processes can be used by extraction unit 120 for table/column/rows recognition. The contents of the tables can be converted into other formats, including HTML. After recognizing tables, the rows with exceptions can be extracted by extraction unit 120 from the converted html file and saved. The extraction unit 120 can categorize the exceptions into different levels of severity.

The report data can be in the form of tables (e.g. the exceptions and important data can be in the tables). The extraction unit 120 can use image processing to recognize tables or cells. The extraction unit 120 can use a library to extract html and locate the text in the tables. The extraction unit 120 can clean the data and extract the tables from the clean data. The extraction unit 120 can extract the exceptions from the clean tables. The extraction unit 120 can use natural language engine 126 to flag feature vectors that are the most similar to feature vectors representing exceptions and they can be flagged as important sections. For example, sections that relate to "test results" can be flagged as being a useful section to detect exceptions. The similarity measure can be computed using a cosine measurement, for example.

The summarization unit 122 can generate a summary of the report. The summarization unit 122 can generate summaries using different approaches: abstractive and extractive. In the extractive approach, the more frequent sentences can be used by summarization unit 122 for creating a short paragraph summary. In the abstractive approach, the summary is generated by summarization unit 122 from the main idea or topic of the section by creating a word graph, discourse rules and syntactic constraints. The summarization unit 122 can generate new language for the summary based on the semantic meaning of the report or section in English and other languages as well. The summarization unit 122 can use the natural language engine 126 and the corpora 128 to understand semantic meaning and topics. The summarization unit 122 can generate the summary based on the exceptions that are extracted by extraction unit 120, for example. The length of the summaries can vary based on a parameter and/or the amount of information in the report or data.

The trend unit 124 can generate trending data based on aggregated data and results. For example, the trend unit 124 can generate exception trending data using historical data that can be loaded into database 112 from a prior run of the process. Using prior data as the baseline, the trend unit 124 can use programmatic logic to assess and aggregate the exceptions year over year in to generate trending data for different example categories: Stable, Stable with Minor exception and Unstable with Major Exceptions.

In an example implementation the platform 100 can involve Python3 running on a Linux OS and an Apache HTTP server. Example Python libraries are TensorFlow, TextRank, Pdfminer, PyPDF2, Wand, Numpy, Scipy, Pdftabextract. Qpdf can be used for removing credentials. ImageMagick and Tesseract can be used for image processing and OCR. Pdftohtml is used for converting the pdf file into xml format. The results can be stored in MongoDB. This is an example only.

The natural language processor 126 can use a trained model that can be generated using training files from example reports. The natural language processor 126 can integrate with the extraction unit 120 to detect exceptions. The natural language processor 126 can integrate with the summarization unit 122 to understand topics or concepts of the report or sections and generate a summary of the report or sections. The natural language processor 126 can integrate with the trend unit 124 to generate trend data.

The natural language processor 126 extract a topic from a report section using latent semantic analysis (LSA) to discover a semantic structure of text using the training data. The natural language processor 126 can implement a similarity query for a report section against the labelled report sections to detect exceptions (for extraction unit 120).

The natural language processor 126 can convert the report sections into feature vectors. For training, the natural language processor 126 can convert training report sections into feature vectors for later comparison to new report sections at production or runtime. An aggregate of the feature vectors can be used to generate or update the corpora 128. The natural language processor 126 can determine a structure of the report section using a vector space model. The natural language processor 126 can use latent semantic analysis to extract conceptual content of the report sections and identify patterns in the report sections.

The interface application 130 can generate and update interfaces with visual elements and receive control comments. The visual elements can be selectable to generate control commands which in turn a dynamically update the display. The interface has visual elements corresponding to the extracted data, exceptions, summaries, trend data, and so on. The interface has fields or buttons to receive parameters for generating dynamic results, such as a supplier name linked to different reports.

The natural language engine 126 can receive feature vectors generated from training report data and update the corpora 128. The feature vectors can represent topics from the training report data. The feature vectors can represent exceptions from the training report data.

In some embodiments, the natural language engine 126 generates the corpora 128 by tokenizing and cleansing training report data to generate the feature vectors. In some embodiments, the natural language engine 126 converts training report data to feature vectors using a bag-of-words model to represent each of the reports (or sections of the reports) a multiset of words that retains multiplicity and disregards grammar and word order. In some embodiments, the natural language engine 126 converts the training report data to feature vectors using a term frequency and inverse document frequency real-valued weights model to identify semantic relationships between words of the report.

In some embodiments, the natural language engine 126 converts the training report data to feature vectors using latent semantic analysis to extract conceptual concepts from the report data and patterns in semantic relationships between words of the training report data. The natural language engine 126 computes topics for semantic similarity queries.

In some embodiments, the natural language engine 126 generates the feature vectors from the training report data, by, for each of the report sections, using a bag-of-words model to represent the respective section as a multiset of words that retains multiplicity and disregards grammar and word order. The natural language engine 126 converts the multiset of words using a term frequency and inverse document frequency real-valued weights model to identify semantic relationships between features of the respective section. The natural language engine 126 extracts topics using LSA by identifying patterns in the semantic relationships between words of the respective section.

The processing device 104 may be, for example, any type of general-purpose microprocessor or microcontroller, a digital signal processing (DSP) processor, an integrated circuit, a field programmable gate array (FPGA), a reconfigurable processor, or any combination thereof.

The storage device 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The I/O unit 102 enables platform 100 to interconnect with one or more input devices, such as a keyboard, mouse, camera, touch screen and a microphone, or with one or more output devices such as a display screen and a speaker.

The communications unit 106 enables platform 100 to communicate with other components, to exchange data with other components, to access and connect to network resources, to serve applications, and perform other computing applications by connecting to a network (or multiple networks) capable of carrying data.

The platform 100 is operable to register and authenticate user (using a login, unique identifier, and password for example) prior to providing access to applications, a local network, network resources, other networks and network security devices.

The platform 100 connects to other components (e.g. interface application 130, devices 140, data sources 160, and databases 170) in various ways including directly coupled and indirectly coupled via the network 150. Network 150 (or multiple networks) is capable of carrying data and can involve wired connections, wireless connections, or a combination thereof. Network 150 may involve different network communication technologies, standards and protocols, for example.

The platform 100 uses training report data to train the natural language engine 126 and build the corpora 128. The feature vectors include topic labels linked to sections or reports. In pattern recognition and machine learning, a feature vector is an n-dimensional vector of numerical features that represent some object. The feature vectors can be generated using a software library that generates topics out of the training report data. The platform 100 can clean and process the input data, transform the corpus using term frequency-inverse document frequency to add weights, and use LSA to generate semantic meaning from words to indicate importance. The platform 100 uses training report data to train the natural language engine 126 to detect exceptions (for extraction unit 120) and generate summaries (for summarization unit 122) for a production or testing phase.

The platform 100 can clean and process the input data normalize data, remove spaces, make text in the same case, and so on. This cleaning and processing can involve a bag-of-words model, for example. The bag-of-words model is a way of representing text data when modeling text. The bag-of-words model relates to feature extraction or feature encoding from text data. The bag-of-words model can involve a vocabulary of known words and a measure of the presence of known words, for example. Term frequency-inverse document frequency can refer to a numerical statistic that can reflect how important a word is to a document in a collection or corpus. LSA is a technique in natural language processing for analyzing relationships between a set of documents and the terms they contain by producing a set of concepts related to the documents and terms.

The natural language engine 126 includes rules to implement natural language processing (NLP) which is a field of computer science, artificial intelligence and computational linguistics concerned with the interactions between computers and human (natural) languages, and, in particular, concerned with programming computers to process large natural language corpora. The corpora 128 can include dictionaries that help the natural language engine 126 process terms that may hold different meanings.

The natural language engine 126 works with extraction unit 120 to implement NLP to detect exceptions in reports using similarity queries to know report data (via training process), for example. The natural language engine 126 works with summarization unit 122 to implement NLP to generate summaries of reports or sections by determining topics or concepts, for example.

The natural language engine 126 can implement unsupervised learning based on similar scores comparing new report sections to training data and supervised learning based on probabilistic classifications. The unsupervised learning process generates features and topics without knowing the topics beforehand. The unsupervised learning process involves processing the report sections to generate topics by cleaning and pre-processing data using a bag-of-words model, transforming the corpus using term frequency-inverse document frequency to add weights, and using LSA to take the semantic meaning of the word to indicate its importance. The unsupervised learning can use a similarity threshold to determine semantic similarity between new report section and the training data. The supervised learning process uses a precision threshold to compare the new report section to the training data for similarity based on the concept suggested by the unsupervised learning. The unsupervised learning process suggests topic X and the supervised learning step compares the report section with other sections related to topic X to see if it is similar to them. The natural language engine 126 improves with input and feedback for exceptions to improve over time and with additional input. Unsupervised learning can be used to better understand what is in the section or report itself (discovery of the content).

The natural language engine 126 can implement cleaning and preprocessing for building the corpus 128 through tokenization using methods such as: removing stop words, punctuation, lemmatization, and capitalization. The corpora 128 can include dictionaries that help the Natural Language Engine 126 understand terms that may hold different meanings in a particular field as compared to other fields.

The natural language engine 126 can convert documents to vectors using a bag-of-words model that simplifies the document by representing the document or section as a multiset of its words, disregarding its grammar and word order but keeping multiplicity. The output of this is a numerical 'feature' (vector) that is used for training models, and the aggregate forms the basis of the 'dictionary' (or a 'corpus of documents').

The natural language engine 126 can bring out hidden structure in the corpus and discover relationships between the words in a more semantic way, and transform the bag-of-words corpus using Term Frequency*Inverse Document Frequency (TfIdf) real-valued weights model. The TfIdf model allows the natural language engine 126 to evaluate how important a word is to the topic of a document.

The natural language engine 126 can utilize Latent Semantic Analysis (LSA) to extract the conceptual content and to identify patterns in the relationships between the features identified by TfIdf to generate a defined number of topics that can be used for similarity queries.

Figure 2:
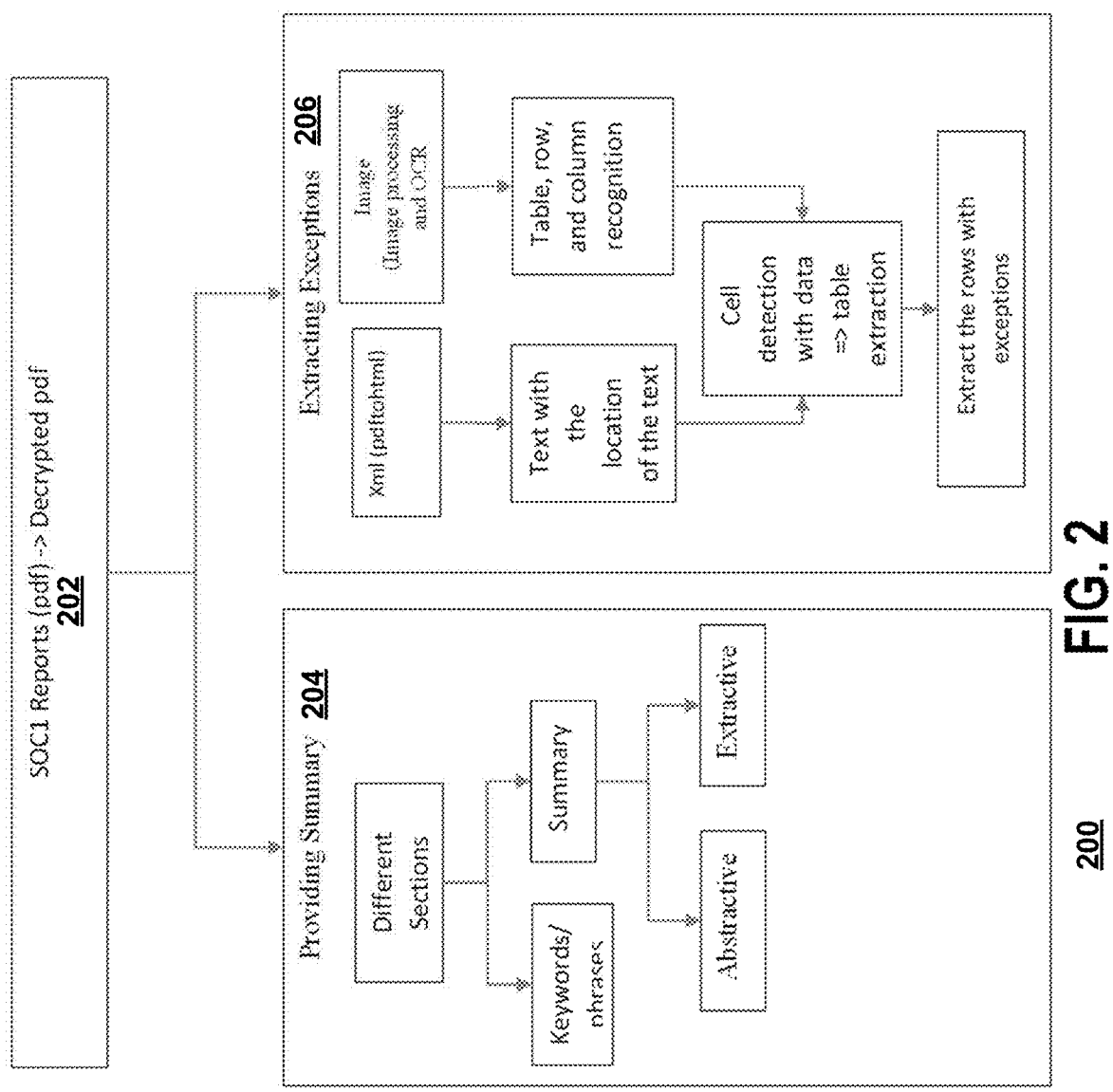
FIG. 2 is an example process for processing reports according to some embodiments.

FIG. 2 is an example process 200 for processing reports according to some embodiments.

At 202, the platform 100 implements decryption and sections separation on received files. The platform 100 can decrypt the original pdf files and separate the files into different sections. A security tool can be used for decryption. The platform 100 can use the pages mentioned in 'Table of Contents' for each section for section separation.

At 204, the platform 100 generates summaries of the report using summarization unit 122. This can involve cleaning the data, generating an extractive summary, or generating an abstractive summary, for example. The summarization unit 122 receives the different sections of the report.

The summarization unit 122 can clean the data by removing non-ascii (or, non-printable) characters from text, removing new line characters, ignoring phrases (e.g. remove sentences that are about the confidentiality of the pdf using fuzzy logic), and so on.

The summarization unit 122 can extract keywords and phrases. The summarization unit 122 can generate a summary of the report or summaries of sections of the report. This can be an extractive summary or an abstractive summary.

The summarization unit 122 can generate an extractive summary which can be used for the purpose of keeping the original sentences in the pdf. For the extractive summary section, summarization unit 122 considers the sentence that is most similar to all other sentences as probably the one that captures the ideas of the text better.

The summarization unit 122 can generate an abstractive summary. For the abstractive summary, instead of copying the important sentences from the text, the summary of the main idea can be provided by summarization unit 122. A training model can be used for abstractive summarization.

For both summary approach, the length of the summary or ratio of the text can be accepted as a parameter by the summarization unit 122.

At 206, the platform 100 recognizes and extracts exceptions of the report using extraction unit 120. After table and consequently cell recognition, there are two levels of filters for recognizing and extracting the rows with exceptions, i.e., related table detection and exception rows extraction. For detecting related tables, the extraction unit 120 can select the tables with the last column name semantically similar to 'Test Result'. After that the rows that have the value similar to 'no exception mentioned' under 'Test Result' column can be removed. The rest of the exception remaining can be extracted as the desired exceptions. Accordingly, the extraction unit 120 can generate an xml or html of the files. The extraction unit 120 can recognize key words in the text and determine the location of the text. The extraction unit 120 can implement table, row, and column recognition. The extraction unit 120 can implement cell detection with data and table extraction. The extraction unit 120 can extract the rows with the exceptions.

Figure 3:
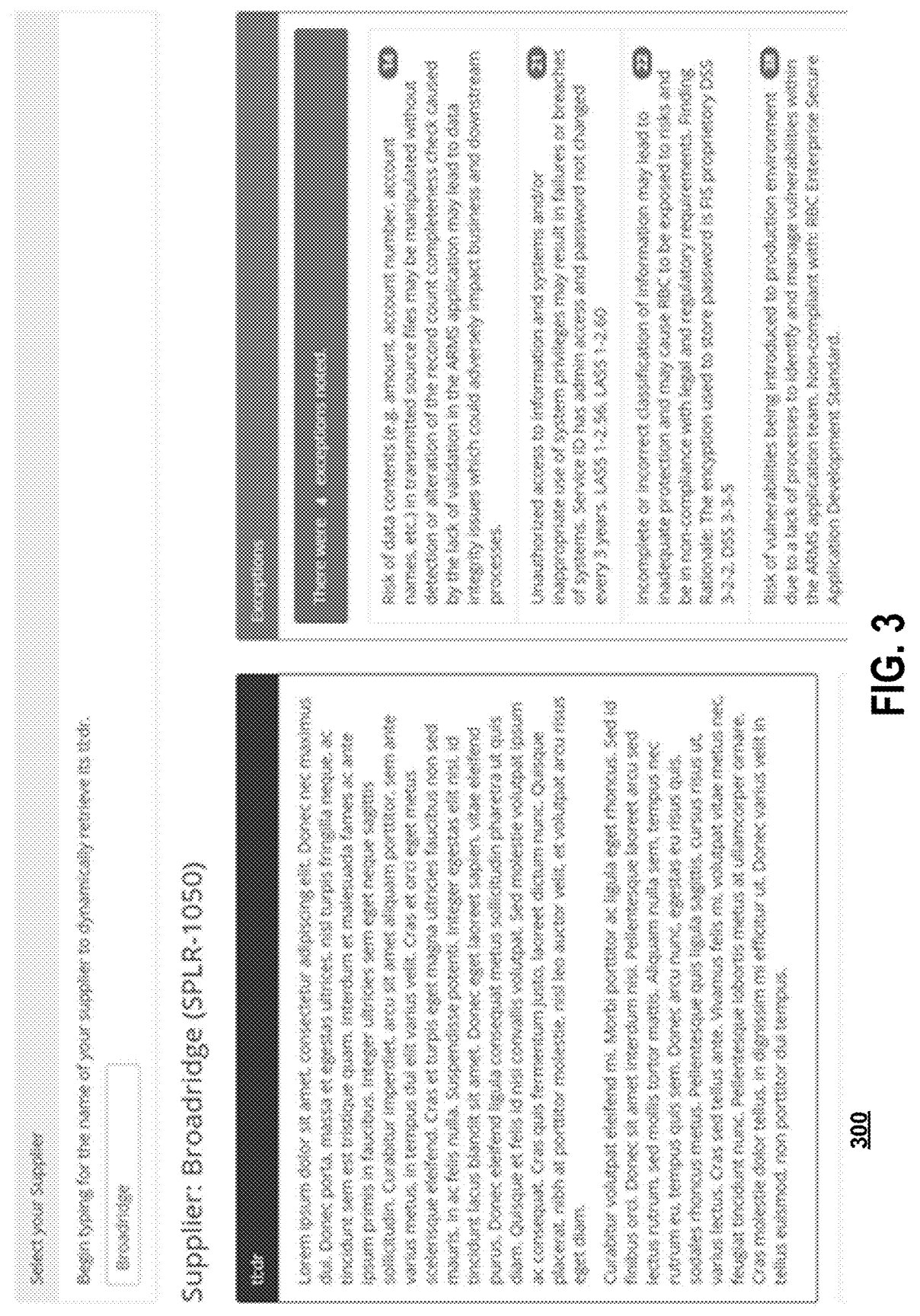

FIG. 3 is an example interface 300 according to some embodiments. The interface 300 can include visual elements that represent the summary and the exceptions. The interface 300 can include a button for selecting a supplier and can update with visual elements by receiving a selected supplier. The interface 300 can indicate the number of exceptions detected along with summaries of different sections of the report that correspond to the detected exceptions. The platform 100 can detect exceptions using natural language processing and the automatically generate summaries of data relevant to the exceptions for display. The display data provides a condensed version of a report highlighting relevant information, such as the detected exceptions. Only a portion of a report is displayed which requires less data at the interface as the entire report does not need to be displayed. The interface 300 can receive a supplier name as input and then update dynamically to display report summaries for the selected supplier along with detected exceptions. The exceptions displayed in interface 300 are selectable to display additional data relating to the exception, such as portions of the report proximate to the exception or referenced by the exception, for example.

Figure 4:
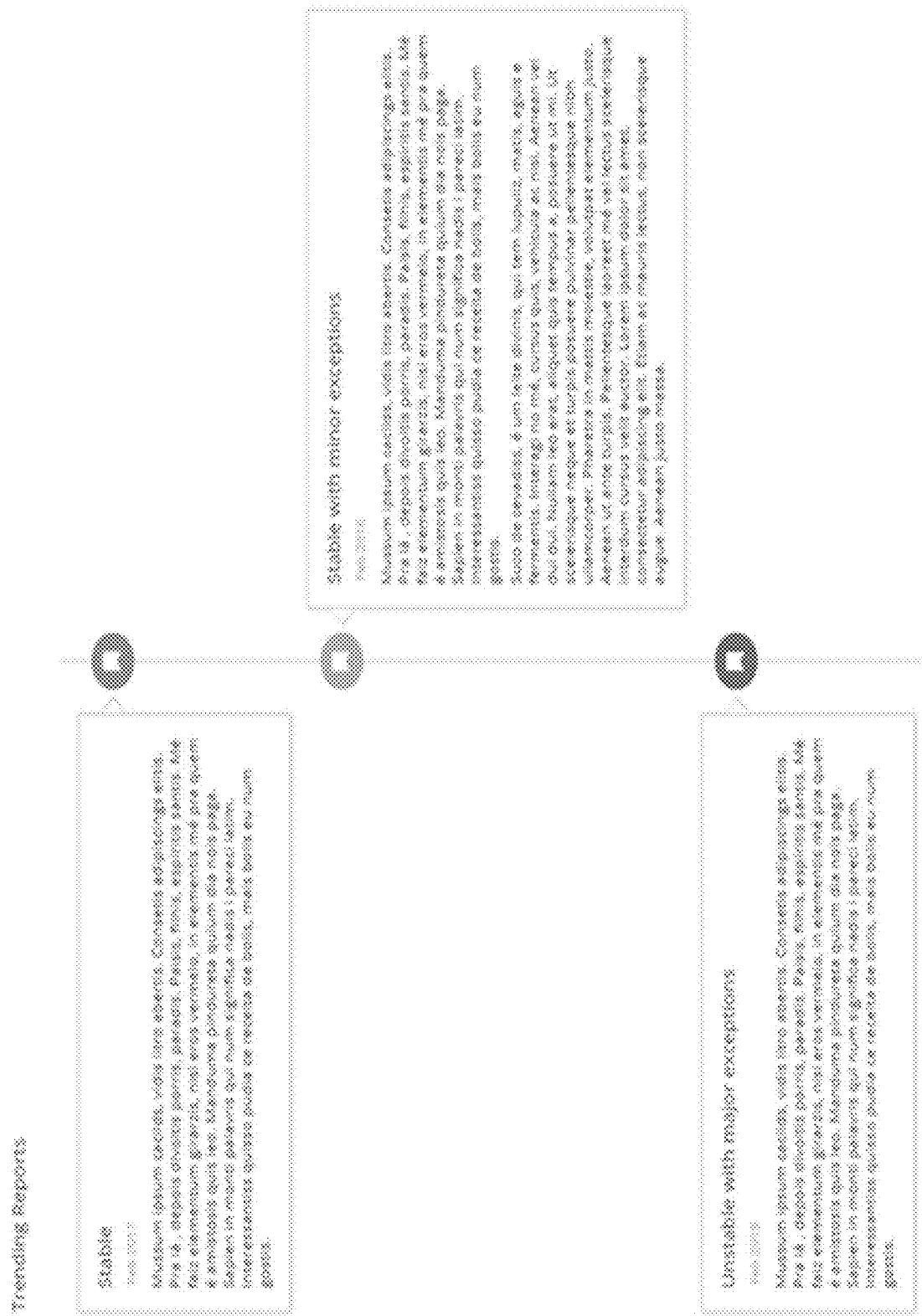
FIG. 4 is an example interface according to some embodiments.

FIG. 4 is an example interface 400 according to some embodiments. The interface 400 can include visual elements that represent trending data. The trending data can relate to multiple reports. In this example the trending data indicates three trending reports. The trending reports are indicated with exceptions detected for the specific report. The trending reports can have detected exceptions that relate to different example categories: Stable, Stable with Minor exception and Unstable with Major Exceptions. The interface 400 can include an indicator for each detected category of exception. The interface 400 can also include a summary for each category or exception. Accordingly, the summarization unit 122 can be configured to generate summaries for an aggregation of multiple reports or sections linked to different trending data categories. The summary can indicate one or more exceptions along with the computed category.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for automatically detecting exceptions in report data using natural language processing, the system comprising a memory storing instructions to configure at least one processor to provide:
a natural language engine having a corpora of report data and exception data, the natural language engine to process training report data to update the corpora;
wherein the at least one processor is further configured to:
extract exceptions from a report using the natural language engine;
generate a summary for the report using the natural language engine to detect topics for sections of the report, at least one of the topics linked to at least one exception of the extracted exceptions, the summary indicating the at least one exception;
to generate trending data for the report and historical reports, the trending data relating to an aggregation of the exceptions;
assign categories to the trending data, the categories comprising Stable, Stable with Minor exception and Unstable with Major Exceptions;
generate an interface for display at an interface application residing on a device, the interface having visual elements corresponding to the exceptions, the summary and the trending data, the visual elements being selectable to trigger commands to update display of the exceptions, the summary and the trending data.

2. The platform of claim 1, wherein the processor uses image processing and character recognition to detect tables, columns, and rows, wherein the exceptions are extracted from contents of the tables, columns, and rows.

3. The platform of claim 1, wherein the processor categorizes the exception with a level of severity.

4. The platform of claim 1, wherein the processor generates an abstractive summary by determining a topic for a section of the report using a word graph.

5. The platform of claim 1, wherein the processor generates an extractive summary based on frequency of sentences or words in a report.

6. The platform of claim 1, wherein the natural language engine implements unsupervised learning to compute a semantic similarity score between the report and the training data.

7. The platform of claim 1, wherein the natural language engine implements supervised learning to compute a probabilistic classification for the report and a corresponding confidence score, the probabilistic classification used for the exception or a topic.

8. The platform of claim 1, wherein the natural language engine generates the corpora by tokenizing and cleansing the training data to generate feature vectors.

9. The platform of claim 1, wherein the natural language engine converts the training data to feature vectors using a bag-of-words model to represent the training data as a multiset of words that retains multiplicity and disregards grammar and word order.

10. The platform of claim 1, wherein the natural language engine converts the training data to feature vectors using a term frequency and inverse document frequency real-valued weights model to identify semantic relationships between words of the training data.

11. The platform of claim 1, wherein the natural language engine converts the training data to feature vectors using latent semantic analysis to extract conceptual concepts from the training data and patterns in semantic relationships between words of the training data, the natural language engine computing topics for semantic similarity queries.

12. The platform of claim 1, wherein the natural language engine implements a semantic similarity query to compare data of the report against the training data to determine a similarity score for the data of the report within a similarity threshold.

13. The platform of claim 12, wherein the similarity query involves computing a similarity score based on a cosine measurement between a feature vector for the data of the report and a feature vector for the training data.

14. The system of claim 1, wherein the interface has an indicator for each category of the categories assigned to the trending data.

15. A non-transitory computer readable medium storing instructions for automatically detecting exceptions in report data using natural language processing, the instructions executable by a processor to provide:
  a natural language engine having a corpora of report data and exception data, the natural language engine to process training report data to update the corpora;
  wherein the at least one processor is further configured to:
  extract exceptions from a report using the natural language engine to compute a semantic similarity score between the report and the training data and a probabilistic classification for the report with a corresponding confidence score, the probabilistic classification used for extracting the exceptions;
  generate a summary for the report using the natural language engine to detect topics for sections of the report;
  generate trending data for the report and historical reports, the trending data relating to an aggregation of the exceptions; and
  assign categories to the trending data, the categories comprising Stable, Stable with Minor exception and Unstable with Major Exceptions.

16. The computer readable medium of claim 15, wherein the processor generates an abstractive summary by determining a topic for a section of the report using a word graph.

17. The computer readable medium of claim 15, wherein the processor generates an extractive summary based on frequency of sentences or words in a report.

18. The computer readable medium of claim 15, wherein the natural language engine generates the corpora by tokenizing and cleansing the training data to generate feature vectors.

19. The computer readable medium of claim 15, wherein the natural language engine converts the training data to feature vectors using a bag-of-words model to represent the training data as a multiset of words.

20. The computer readable medium of claim 15, wherein the natural language engine converts the training data to feature vectors using a term frequency and inverse document frequency real-valued weights model to identify semantic relationships between words of the training data.

21. The computer readable medium of claim 15, wherein the natural language engine converts the training data to feature vectors using latent semantic analysis to extract conceptual concepts from the training data and patterns in semantic relationships between words of the training data, the natural language engine computing topics for semantic similarity queries.

22. The computer readable medium of claim 15, wherein the natural language engine implements a semantic similarity query to compare data of the report against the training data to determine a similarity score for the data of the report within a similarity threshold.

23. The computer readable medium of claim 15, wherein the similarity query involves computing a similarity score based on a cosine measurement between a feature vector for the data of the report and a feature vector for the training data.

24. A method for automatically detecting exceptions in report data using natural language processing, the method comprising:
  extracting exceptions from a report using a natural language engine, the natural language engine having a corpora of report data and exception data;
  generating a summary for the report using the natural language engine to detect topics for sections of the report using feature vectors;
  generating trending data for the report and historical reports, the trending data relating to an aggregation of the exceptions;
  assigning categories to the trending data, the categories comprising Stable, Stable with Minor exception and Unstable with Major Exceptions; and
  generating an interface for display at an interface application residing on a device, the interface having visual elements corresponding to the exceptions, the summary and the trending data, the visual elements being selectable to trigger commands to update display of the exceptions, the summary and the trending data.

* * * * *